UNITED STATES PATENT OFFICE.

ERNEST W. WESCOTT, OF NIAGARA FALLS, NEW YORK, ASSIGNOR TO KALMUS, COMSTOCK & WESCOTT, INCORPORATED, OF BOSTON, MASSACHUSETTS, A CORPORATION OF MASSACHUSETTS.

TREATING ORES.

1,406,597. Specification of Letters Patent. Patented Feb. 14, 1922.

No Drawing.   Application filed April 6, 1921. Serial No. 459,078.

*To all whom it may concern:*

Be it known that I, ERNEST W. WESCOTT, a citizen of the United States, residing at Niagara Falls, in the county of Niagara and State of New York, have invented certain new and useful Improvements in Treating Ores, of which the following is a specification.

This invention relates to treating ores; and it comprises a method of treating unoxidized ores, such as arsenid ores and speisses with chlorin wherein such ore or speiss is given a preliminary treatment with hydrochloric acid, or another acid, to free it of reactive oxidized bodies of basic nature and is then chlorinated; the acid used being advantageously hydrochloric acid produced as a by-product in working up arsenious chlorid formed in chlorination; all as more fully hereinafter set forth and as claimed.

Certain ores, such as those from Cobalt, Ontario, carry their metallic values as arsenids; that is, the metals are directly combined with arsenic; and the same is true of the metallurgical products known as speisses. Sometimes these ores and speisses contain sulfids; and occasionally the proportion of sulfur is rather high. These ores and speisses are difficult of beneficiation by ordinary metallurgical methods because of the presence of the arsenic; but by treating the pulverulent ore with chlorin at a rather high temperature, the arsenic is converted into arsenious chlorid which escapes as vapor while the valuable metals for the most part remain behind as fixed chlorids which can be readily handled by ordinary methods. Any sulfids which may be present also chlorinate, with production of sulfur chlorid which goes forward with the arsenious chlorid as vapor. The action of the chlorin on the ore evolves much heat and with a tolerably rich ore, this heat may be and usually is, sufficient to maintain the desired temperature. Indeed, with rich ores it is often desirable to moderate the action somewhat, which may be done by admixing the ore with a certain proportion of inert residue (sand and silicates) of gangue mineral which has been through the operation and from which the metallic values have been extracted. Ordinarily, I maintain the temperature in the neighborhood of 500° to 550° C., since at this temperature action is quick and complete and the residual fixed chlorids (cobalt, nickel, copper, silver, etc.) do not volatilize or sinter to any extent. At this temperature the effluent mixture of vapors and gases carries forward the arsenic, sulfur if present and some ferric chlorid. Cobalt, nickel, silver and copper remain behind in the form of chlorids which can be readily extracted from the chlorinated ore.

In this operation, the action is the conversion of certain unoxidized ore minerals (arsenids) into chlorids with evolution of heat; this evolution of heat being relied upon, at least in part, to maintain the necessary temperature. Naturally, the charge must remain open and pervious, with free access of chlorin gas to every particle; both for the sake of efficiency of chlorination and for that of even, regular development of heat. Fusion, sintering or development of stickiness in the charge are to be avoided. Most ore concentrates however carry more or less gangue mineral; and the character of the gangue mineral is important in the practical operation of the process. In so far as the gangue is composed of silica (sand) or inert silicates, it is harmless and may even be advantageous. As stated, it is sometimes desirable, and particularly with rich ores, to raise artificially the proportion of gangue of this character in order to moderate the development of heat and to keep the charge open and pervious. But the presence of substantial amounts of gangue minerals of readily reactive character, attacked either by chlorin or by the metal chlorids it forms, is undesirable as interfering with smooth and efficient chlorination of the unoxidized ore minerals. Calcium carbonate, which is often a gangue component in the form of limestone or dolomite, is particularly undesirable, especially where temperatures in chlorination are maintained at a rather high point. Magnesium carbonate, which often accompanies it, is also undesirable.

Calcium carbonate, at 600° C. and above begins to lose carbon dioxid with formation of lime which reacts with chlorids to form calcium chlorid; and the presence of calcium chlorid in any substantial amount is quite disadvantageous in this process. Magnesium carbonate loses carbon dioxid with formation of reactive magnesia at much lower temperatures. I have found in working with certain ore concentrates relatively rich in calcite (calcium carbonate), the finely powdered ore going through the reaction chamber is apt to become sticky or even sinter down to a semi-fused mass. Apparently this is due to formation of calcium chlorid which, in conjunction or combination with, more or less ferric chlorid forms a binder for the rest of the mass. With the development of the binder, the mass of course becomes less pervious to chlorin and development of heat slackens, with the result that the mass "freezes" and becomes hard of removal. Similar phenomena take place with ores containing magnesia or basic oxides. Speisses do not carry gangue minerals but they sometimes carry basic silicates or oxides with similar disadvantages.

I have found that it much conduces to regularity of operation, if basic or reactive oxidized bodies be removed from the ore prior to chlorination and that this removal can be simply effected by extracting the ore with acid. Acids do not substantially affect the arsenids or inert silicates but they do remove carbonates and reactive oxides, etc.; that is those bodies which would interfere with the regular progress of the chlorination operation.

In the present invention therefore I extract the ore or speisses preliminarily with a certain amount of acid in order to remove calcium carbonate, magnesium carbonate and other reactive basic and oxidized bodies which may be present. With basic oxidized reactive bodies removed, there is nothing to interfere with the smooth interaction of the arsenids and the chlorin; and the material under chlorination remains open and pervious, with all portions accessible to the action of the gas. While other acids may be employed, I find hydrochloric acid on the whole to be the best since it has good solvent power and the chlorids formed are easily soluble and easily removed by washing. Sulfuric acid leaves insoluble calcium sulfate, which is not desirable in admixture with the ore. Hydrochloric acid is particularly suitable for the present purposes, since it is a by-product in various processes of working up and utilizing the arsenious chlorid which forms a product of the chlorinating operation. This hydrochloric acid is often arseniferous, but the dissolved arsenic does no harm where the leaching liquid used on the ore is kept somewhat acid.

In the case of some ores, speisses and concentrates containing more or less oxygen in the form of reactive oxids, the leaching may result in the solution of a certain amount of valuable metals, such as cobalt, nickel and copper; in this event, the metals are recovered from the leaching liquids by well known methods. Ordinarily, however, the only material extracted to any substantial extent other than gangue particles of calcite, dolomite, etc., is arsenic, and the amount of this removed is not great.

In one way of utilizing arsenious chlorid, it is hydrolyzed with a limited amount of water thereby giving a deposition of white arsenic ($As_2O_3$) and an acid mother liquor containing hydrochloric acid and a little dissolved arsenic. This acid mother liquor is usually treated subsequently to extract the remaining dissolved arsenic by processes which involve solution therein of calcium carbonate to neutralize much or most of the contained HCl. In so far as such mother liquor can be used for extracting calcium carbonate from the original ore, a double utility is subserved: the ore is freed of limestone gangue which would cause inconvenience in chlorination and the mother liquor is partially neutralized, therefore economizing in the amount of calcium carbonate which must be added in recovering dissolved arsenic.

In another method of utilizing arsenious chlorid, it is treated hot with water and chlorin, thereby forming a solution of arsenic acid and vapors of HCl passing forward. With these vapors more or less arsenic may go forward. These vapors may be condensed by water and the hydrochloric acid so formed utilized in extracting ore.

Not all ores and speisses and concentrates carry enough basic oxygen-containing material to be harmful in the chlorinating action, but some do. The amount which is harmful of course depends more or less upon the particular temperature used in chlorinating and upon the amount of silicious gangue present—it is largely a question of chlorinating without sintering. The lower the temperature of chlorination and the greater the amount of silicious unreactive gangue the greater can be the proportion of reactive basic oxygenated bodies present without harm and vice versa.

In a typical embodiment of the present invention presuming the treatment to be of a cobalt arsenid concentrate carrying more or less intermixed calcareous gangue, the ore is treated with hydrochloric acid from a later operation, the amount of hydrochloric acid being greater than corresponds to the basic matter present so that the leaching liquid remains freely acid. The ore and the acid may be heated together or a column of granulated ore may be merely leached with cold or hot acid. The ore is afterward washed and dried and is then ready for chlorination.

The arsenious chlorid, if treated with a limited amount of water, say, 2 to 8 parts by weight of water to each part by weight of $AsCl_3$, hydrolysis, giving a mother liquor containing HCl and a deposit of white arsenic ($As_2O_3$). Good results are obtained by using 340 parts of water for 100 parts of $AsCl_3$. With this proportion of water, the mother liquor contains 16 to 17 per cent. HCl and a minimum amount of arsenic in solution, usually about 1.7 per cent. (17 grams per liter). While there is not much of this dissolved arsenic, it is desirable to recover it. In recovering the dissolved arsenic, one way consists in first nearly completely neutralizing the acidity with calcium carbonate (whiting, chalk, ground limestone, etc.) and thereafter precipitating the arsenic as arsenite with slaked lime. The arseniferous mother liquor resulting from the hydrolysis of $AsCl_3$ may be used in the present operation, being employed to leach the fine ore. Care is taken that the acidity is not completely neutralized, since that would result in a precipitation of oxidized arsenic in the ore, which would be inconvenient in the later chlorinating operation. Enough of the mother liquor is used however to extract substantially completely all reactive or basic bodies. After the acid extraction, the ore is washed with water in well understood ways, and dried and is then subjected to chlorination.

Unoxidized Canadian cobalt ores and unoxidized speisses show no important loss of cobalt, nickel or silver resulting from this acid leaching.

While I regard the present invention as particularly applicable to arsenid ores and speisses, with or without sulfids, it is also applicable to sulfid ores and mattes in chlorinating which the same sintering difficulties are apt to develop.

What I claim is:—

1. The process of preparing unoxidized ores and metallurgical products such as arsenid ores and speisses for chlorination to recover values therefrom as chlorids which comprises preliminarily extracting the pulverulent material with acid.

2. The process of preparing unoxidized ores and metallurgical products such as arsenid ores and speisses for chlorination to recover values therefrom as chlorids which comprises preliminarily extracting pulverulent material with hydrochloric acid.

3. In the treatment of arsenid ores and speisses, the process which comprises extracting the pulverulent material with arseniferous hydrochloric acid from a later operation, chlorinating the extracted ore to furnish arsenious chlorid and fixed chlorids, and hydrolyzing the arsenious chlorid produced with water, the HCl solution thereby produced being returned to serve in the extraction of arsenid material.

4. In the treatment of arsenid ores and speisses, the process which comprises chlorinating acid-extracted material to furnish vapors of arsenious chlorid and a residue of fixed chlorids, condensing said chlorids, hydrolyzing condensed arsenious chlorid with a limited amount of water to furnish white arsenic and an acid mother liquor and partially neutralizing the acidity of said mother liquor with arsenid material containing calcium carbonate, such arsenid material after extraction being used in the first step of the process.

In testimony whereof, I affix my signature.

ERNEST W. WESCOTT.